United States Patent [19]

Joó et al.

[11] Patent Number: 4,526,669
[45] Date of Patent: Jul. 2, 1985

[54] CATHODIC COMPONENT FOR ALUMINUM REDUCTION CELL

[75] Inventors: Louis A. Joó, Johnson City; Kenneth W. Tucker, Elizabethton, both of Tenn.; Scott D. Webb, Greenville, Miss.

[73] Assignee: Great Lakes Carbon Corporation, New York, N.Y.

[21] Appl. No.: 384,594

[22] Filed: Jun. 3, 1982

[51] Int. Cl.³ .................... C25C 3/08; C25B 11/02; C25B 11/12; B29C 25/00
[52] U.S. Cl. .................. 204/243 R; 204/288; 204/294; 204/292; 204/279; 264/29.1; 264/332; 264/109; 264/63
[58] Field of Search .... 204/288, 292, 294, 243 R–247, 204/67, 279; 264/111, 332, 109, 63, 29.1

[56] References Cited

U.S. PATENT DOCUMENTS

| | | | |
|---|---|---|---|
| 3,011,982 | 12/1961 | Maouk et al. | 204/291 X |
| 3,328,280 | 6/1967 | Richards et al. | 204/292 X |
| 3,705,112 | 12/1972 | Nienart | 264/332 X |
| 3,909,375 | 9/1975 | Holliday et al. | 204/67 X |
| 4,243,502 | 6/1981 | Kugler | 204/294 X |
| 4,275,025 | 6/1981 | May, Jr. | 264/63 |
| 4,308,114 | 12/1981 | Das et al. | 204/294 X |
| 4,353,885 | 10/1982 | Hoekje | 264/332 X |
| 4,376,690 | 3/1983 | Kugler | 204/67 X |

Primary Examiner—Donald R. Valentine
Attorney, Agent, or Firm—Adrian J. Good

[57] ABSTRACT

A cathodic element for a Hall-Heroult aluminum reduction cell is formed from a refractory hard metal, preferably $TiB_2$, in a generally mushroom-shaped configuration. The element is economical of raw materials and has improved thermal endurance when compared to a right cylinder or other element of uniform cross-section.

7 Claims, 2 Drawing Figures

CATHODIC COMPONENT FOR ALUMINUM REDUCTION CELL

BACKGROUND OF THE INVENTION

Refractory hard metals (RHM) as a class are hard, dense materials with high melting points, and are generally of low solubility in most reagents and molten cryolite and resistant to corrosive attack by most acids and alkalis.

RHMs have high electrical conductivity due to their metallic structure; consequently, this combination of properties has made them candidates for use as electrodes in molten salt electrolysis processes where their corrosion resistance and conductivity are vital properties needed for economical performance.

The RHMs have other properties which have limited their usage up to the present time. They are usually brittle, have little resistance to thermal shock, and are quite expensive to produce and fabricate into useful articles.

RHM articles have been produced by a number of processes including hot pressing of the granular or powdered materials, chemical vapor deposition, and in situ reduction of metals by carbon or other reducing agents. Hot pressing is the most commonly used process for production of shapes. A die and cavity mold set is filled with powder, heated to about 300°–800° C. and placed under pressure of about $2 \times 10^8$ Pa, then removed from the mold and heated at about 1500°–2000° C., or higher, or sintered in the mold.

Hot pressing has the limitations of applicability to simple shapes only, erosion of the mold, and slow production. The pieces produced by hot pressing are subject to a high percentage of breakage in handling, making this process expensive in terms of yield of useful products.

The RHMs of most interest include the carbides, borides, and nitrides of the metals of groups IVA, IVB, VB, and VIB of the periodic table, particularly Ti, V, Si, and W. Of these, the borides are of most interest as electrodes in high temperature electrolysis applications due to their electrical conductivity. Of the borides, $TiB_2$ has been extensively investigated for use as a cathode or cathodic element in the Hall-Heroult cell.

Typically the Hall cell is a shallow vessel, with the floor forming the cathode, the side walls a rammed coke-pitch mixture, and the anode a block suspended in the molten alumina-cryolite bath at an anode-cathode separation of a few centimeters. The anode is typically formed from a pitch-calcined petroleum coke blend, prebaked to form a monolithic block of amorphous carbon. The cathode is typically formed from a prebaked pitch-calcined anthracite or coke blend, with iron cast-in-place around steel bar electrical conductors in grooves in the bottom side of the cathode.

During operation of the Hall cell, only about 25% of the electricity consumed is used for the actual reduction of alumina to aluminum, with approximately 40% of the current consumed by the voltage drop caused by the resistance of the bath. The anode-cathode spacing is usually about 4–5 cm., and attempts to lower this distance result in an electrical discharge from the cathode to the anode through suspended aluminum droplets.

The aluminum is present as a liquid pad in the cell overlaying the cathode, but is not in a quiescent state due to the factors of preferential wetting of the carbon cathode surface by the cryolite melt in relation to the molten aluminum, causing the aluminum to form droplets, and the erratic movements of the molten aluminum from the strong electromagnetic forces generated by the high current density.

The wetting of a solid surface in contact with two immiscible liquids is a function of the surface free energy of the three surfaces, in which the carbon cathode is a low energy surface and consequently is not readily wet by the liquid aluminum. The angle of a droplet of aluminum at the cryolite-aluminum-carbon junction is governed by the relationship $$\cos \theta = \frac{\alpha_{12} - \alpha_{13}}{\alpha_{23}}$$

where $\alpha_{12}$, $\alpha_{13}$, and $\alpha_{23}$ are the surface free energies at the aluminum carbon, cryolite-carbon, and cryolite-aluminum boundaries, respectively.

If the cathode were a high energy surface, such as would occur if it were a ceramic instead of carbon, it would have a higher contact angle and better wettability with the liquid aluminum. This in turn would tend to smooth out the surface of the liquid aluminum pool and lessen the possibility of interelectrode discharge allowing the anode-cathode distance to be lowered and the thermodynamic efficiency of the cell improved, by decreasing the voltage drop through the bath.

Typically, amorphous carbon is a low energy surface, but also is quite durable, lasting for several years duration as a cathode, and relatively inexpensive. However, a cathode or a cathode component such as a $TiB_2$ stud which has better wettability and would permit closer anode-cathode spacing could improve the thermodynamic efficiency and be very cost-effective.

Several workers in the field have developed refractory high free energy material cathodes. U.S. Pat. No. 4,297,180, Foster, Oct. 27, 1981, discloses a cell for the electrolysis of a metal component in a molten electrolyte using a cathode with refractory hard metal $TiB_2$ tubular elements protruding into the electrolyte. Ser. No. 043,242, Kaplan et al. (Def. Pub.), filed May 29, 1979, discloses Hall cell bottoms of $TiB_2$. Ser. No. 287,125, filed July 27, 1981, by L. A. Joo' et al., discloses sintered refractory hard metal objects. U.S. Pat. No. 4,308,114, Das, Dec. 29, 1981, discloses operation of a Hall cell with $TiB_2$ cathodes. U.S. Pat. No. 4,308,115, Foster, Dec. 29, 1981, discloses a Hall cell cathode of graphite coated with $TiB_2$. European Appln. No. 81810185.9, Swiss Aluminium, publ. Dec. 2, 1981, discloses $TiB_2$ cathodic elements for Hall cells.

SUMMARY OF THE INVENTION

Titanium Diboride, $TiB_2$ has been proposed for use as a cathodic element in Hall cells, giving an improved performance over the amorphous carbon and semigraphite cathodes presently used.

It had previously been known that Titanium Diboride ($TiB_2$) was useful as a cathode component in the electrolytic production of aluminum, when retrofitted in the Hall cell in conjunction with or as a replacement for the carbon or semi-graphite form. The electrical efficiency of the cell was improved due to better conductivity, due mainly to a closer anode-cathode spacing. If the anode-cathode (A-C) distance could be lowered, the % savings in electricity would be as follows:

| A-C distance | % savings |
| --- | --- |
| 3.8 cm. | std. |
| 1.9 cm. | 20% |
| 1.3 cm. | 27% |
| 1.0 cm. | 30% |

The principal deterrent to the use of $TiB_2$ as a Hall cell cathode has been the sensitivity to thermal shock and the great cost, approximately $25/lb. as compared to the traditional carbonaceous compositions, which cost about $0.60/lb.

We have invented an improved and novel cost effective cathodic RHM component or element for a Hall-Heroult aluminum reduction cell which is shaped generally like a mushroom or toadstool. The novel shape may be fabricated by any of a number of processes including pressureless sintering of non-compacted RHM powders, molding of RHM powders in a plastic mix with a binder, isostatic or axial pressing of RHM powders to make a preform and sintering the preform, and in situ production of a RHM shape by reaction in the mold of RHM-forming precursors, e.g., $TiO_2$, $B_2O_3$ and carbon or $TiO_2$, $B_4C$ and C, which react to form $TiB_2$ at temperatures in excess of 1200° C.

The monolithic element made in this shape provides a large anode-facing cathodic surface area, allowing a lower current density for the total cell current. It maintains control over the stirring action in the aluminum pool by its baffling effect. It minimizes the material costs of the expensive $TiB_2$. It allows the desired cavity and collection area for the molten aluminum. It contributes to a smaller voltage drop and increased current efficiency for the electrolysis current. It has improved thermal shock resistance as compared to a solid cylinder of the same height and diameter.

DETAILED DESCRIPTION OF THE INVENTION

When sintering the element in a loosely filled mold, a $TiB_2$ powder having these characteristics is particularly useful:

| Ti | 69.06% |
| --- | --- |
| B | 31.24% |
| C | 2270 ppm (parts per million) |
| $O_2$ | 3490 ppm |
| $N_2$ | 150 ppm |
| Al | 0.1% |
| Particle size, mean | 7μ |
| Particle size, 5–15μ | 90% |
| Particle size, max. | 44μ |

Refractory hard metal (RHM) powders and mixtures of RHM powders with particulate carbonaceous matter such as calcined petroleum coke, metallurgical coke, graphite flour, and charcoal flour may be sintered at 1700°–3000° C. in an inert atmosphere, e.g., argon. The RHM's most useful are the borides of Ti, Ta, and Zr; however, the carbides, borides, and nitrides of the metals in groups IVA, IVB, VB and VIB of the periodic table may be used, particularly Ti, V, Si, and W.

The element may also be molded from a plastic mixture of RHM dispersed in a carbon-forming binder such as coal tar pitch, RHM pressed to a preform and sintered, or formed from RHM-forming reactants in situ.

The shaped element is baked for 1–10 days on a cycle rising to 700°–1200° C. It may be advantageous to impregnate the baked articles with a carbonaceous liquid, such as petroleum pitch having a softening point of about 110°–120°, or phenol-formaldehyde or other resins. The article is placed in an autoclave, a vacuum is drawn to remove air, then the hot melted pitch at about 150°–300° C., or other impregnant is let in and the pressure is increased to as much as $15 \times 10^3$ Pa (200 psi). The liquid impregnant is allowed to thoroughly penetrate the accessible porosity. After removal from the autoclave, the resin is cured, or the pitch impregnated body is re-baked converting the residue to amorphous carbon. It may be then heated to 2000°–3000° C., in an inert atmosphere, to convert the amorphous carbon matrix to graphite, or force the RHM forming reaction and sinter the RHM particles. The graphitized body may be re-impregnated, re-baked, and re-graphitized.

DESCRIPTION OF THE DRAWINGS

FIG. 2 illustrates a version in which the stem and a portion of the head may be hollow, showing the void space 18. The space 18 may also be taken up by a preform of a material with a CTE matching the stem and head, such as a foamed carbon.

EXAMPLE 1

Figure 1:
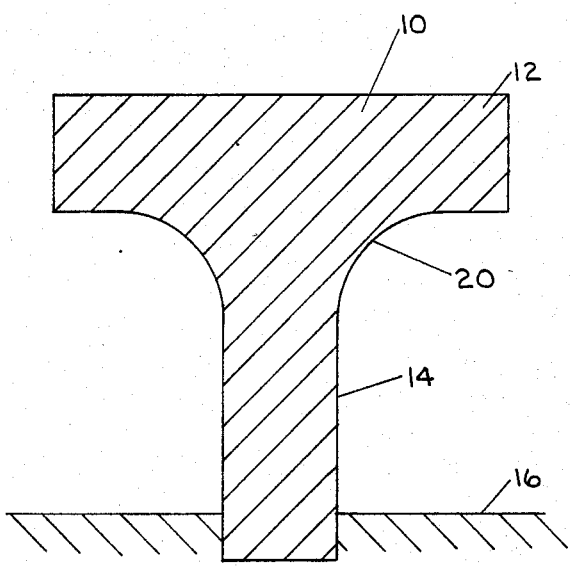
FIG. 1. The basic shape of the cathodic element 10 has a reasonably flat-topped or planar upper working surface 12 which faces the anode, with a stem support 14 of smaller cross-section than the working surface. The stem support is normally embedded into the cathode base 16, which may be a graphite or amorphous baked carbon or graphitic carbon coated with a melt-resistant RHM such as SiC or $Si_3N_4$. While a mushroom or toadstool is normally rounded and has a circular cross-section, other shapes such as a square or a rectangle, may use the space and electrolysis current more efficiently. The junction 20 of the working surface and stem is a curve to lessen stress points.
Figure 2:
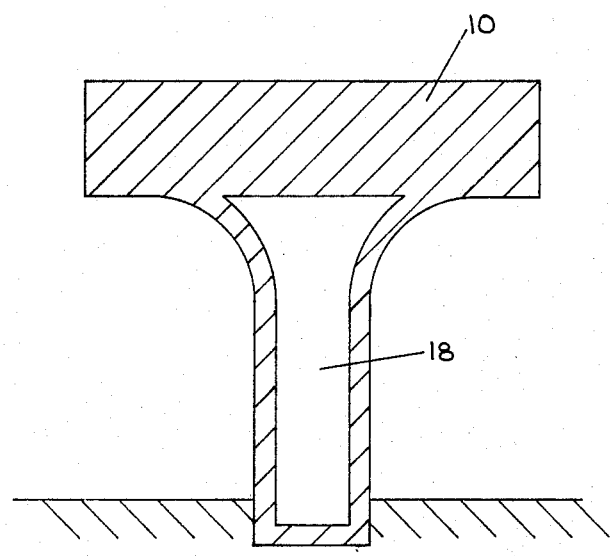
FIG. 2.

A mushroom shape RHM cathode element was made by a low density sintering process in which a mold was filled with powdered $TiB_2$, vibrated to eliminate voids, and sintered, the temperature rising slowly to 2100° C. then cooling to ambient in an argon atmosphere. The element had the following dimensions:

| Stem diameter | 2.98 cm |
| --- | --- |
| Stem and curve length | 5.66 cm |
| Top thickness | 1.46 cm |
| Top diameter | 8.69 cm |
| Overall height | 7.12 cm |
| Weight | 334.7 g |
| Volume | 126.7 cc |
| Apparent density | 2.64 g/cc |

A solid cylinder having similar working surface has these dimensions:

| Diameter | 8.69 cm |
| --- | --- |
| Height | 7.12 cm |
| Volume | 422.00 cc |

Thus, whereas the mushroom shape has a volume of 126.7 cc, a cylinder with the same top surface has a volume of 422 cc, and on a strict raw material cost, the mushroom shape will cost only 30% as much as the solid cylinder.

EXAMPLE 2

A larger element was made with the following dimensions by a loose fill and sintering process as in EXAMPLE 1:

|  | Mushroom | Solid cylinder |
| --- | --- | --- |
| Top diameter | 10.16 cm | 10.16 cm |
| Overall Height | 11.43 cm | 11.43 cm |
| Stem diameter | 3.05 cm |  |
| Top thickness | 1.46 cm |  |
| Volume | 188.88 cc | 926.69 cc |

The mushroom has 20% of the volume, identical upper working surface and height, and thus, 80% saving in raw material costs, as compared to a solid right cylinder.

We have further unexpectedly and advantageously found that the elements of our invention are more resistant to thermal shock than solid cylinders having the same top diameters and heights.

EXAMPLE 3

A mushroom-shaped element was manufactured by mixing $TiB_2$ powder with coal tar pitch (having a 110° C. softening point) at about 160° C., at a ratio of 85/15 $TiB_2$/pitch by wt. The RHM/binder ratio may vary from 70/30 to 98/2 by wt. When the $TiB_2$ was completely wetted and the mixture a smooth plastic mass, it was placed in a mold, preheated to 105° C., and pressed at about $1.4 \times 10^7$ Pa (2000 psi).

The piece was then taken out of the mold and baked for 6 days on a cycle rising to 720° C., to carbonize the pitch binder holding the $TiB_2$ particles in place. It was impregnated with a carbon forming binder, a petroleum pitch having a softening point range of 110°–120° C., under alternate cycles of vacuum and a pressure of about $7 \times 10^3$ Pa at about 240° C. for 2 hours, and rebaked, as above, to increase the density and strength and decrease porosity. The baked piece was heated to about 2300° C. to convert the carbonaceous matrix to graphite. It may be re-impregnated, re-baked, and graphitized.

EXAMPLE 4

Powdered $TiB_2$ and a carbonaceous powder is mixed at a 90/10 $TiB_2$/carbon ratio by wt., poured into a mold having a mushroom shaped cavity, vibrated to remove air pockets, and sintered at 1700°–2400° C. to sinter the $TiB_2$/C mixture and graphitize the carbon residue. It may also be impregnated, re-baked, and re-graphitized at about 2400° C. in an argon atmosphere. The resulting mushroom shaped piece has good electrical and thermal properties.

EXAMPLE 5

$TiB_2$ powder is poured into a die and cavity set having a mushroom shaped cavity, heated to 500° C., and axially pressed at about $2 \times 10^8$ Pa, then removed from the mold and heated to about 2300° C. in argon to sinter the piece.

EXAMPLE 6

A mold having a mushroom-shaped cavity is partially filled with $TiB_2$ powder, then a porous carbon preform having a coefficient of thermal expansion similar to $TiB_2$ inserted into the mold. The mold is filled with $TiB_2$ powder around the preform and sintered as in Example 1. The cathodic element has excellent thermal endurance.

EXAMPLE 7

A mold having a mushroom-shaped cavity is partially filled with $TiB_2$ powder, then a wood preform in the shape of the desired internal void inserted into the mold. The mold is filled with $TiB_2$ powder around the preform and sintered as in Example 1. The cathodic element produced has a void left by the carbonization of the wood preform and has excellent thermal endurance. Other preforms which are heat-decomposable or fugitive, such as thermoplastic or thermosetting polymers, may be used. The thin walls of the hollow element contribute to its excellent thermal shock resistance.

EXAMPLE 8

Using the materials and method as in Example 3, a hollow element may be made by placing a fugitive preform in the center of the mold and molding the article around the preform. The preform used may be a molded phenol-formaldehyde plastic piece, which decomposes at a temperature starting at about 400° C., wood, or some other material which is stable at temperatures high enough to allow solidification of the piece, but which decomposes below the sintering temperature to leave a void.

EXAMPLE 9

A mushroom-shaped element of Example 3, after baking to 720° over a 6 day cycle, was next put directly into a furnace and heated to 2300° C. to graphitize the carbon residue and sinter the $TiB_2$. A strong, homogeneous and efficient cathodic element was produced.

We claim:

1. A monolithic cathodic element for a Hall-Heroult aluminum reduction cell having the approximate configuration of a round toadstool with a substantially horizontal upper round anode-facing surface and a substantially round vertical stem lower support and sole current-carrying means for said anode-facing surface fastened to the floor of said cell wherein the area of said anode-facing surface is greater than the cross-sectional area of said stem support means, said element comprising a refractory hard metal selected from the group consisting of the borides, carbides and nitrides of metals of groups IVA, IVB, VB and VIB of the periodic table produced by filling a mold with particles comprising said refractory hard metal in non-compacted form without either a fugitive binder or sintering aid and heating the filled mold in an inert atmosphere to a sintering temperature for said particles without the application of pressure at any stage of the process.

2. A monolithic cathodic element for a Hall-Heroult aluminum reduction cell having the approximate configuration of a round toadstool with a substantially horizontal upper round anode-facing surface and a substantially round vertical stem lower support and sole current-carrying means for said anode-facing surface fastened to the floor of said cell, wherein the area of said anode-facing surface is greater than the cross-sectional area of said stem support means, said element comprising a refractory hard metal selected from the group consisting of the borides, carbides and nitrides of metals of groups IVA, IVB, VB and VIB of the periodic table produced by filling a mold with a mixture of refractory hard metal and carbon particles by pouring the mixture into the mold by gravity only, and heating the filled mold in an inert atmosphere to a sintering temperature for said mixture and sintering without the application of external pressure.

3. A monolithic cathodic element for a Hall-Heroult aluminum reduction cell having the approximate configuration of a round toadstool with a substantially horizontal upper round anode-facing surface and a substantially round vertical stem lower support and sole current-carrying means for said anode-facing surface fastened to the floor of said cell, wherein the area of said anode-facing surface is greater than the cross-sectional area of said stem support means, said element comprising a refractory hard metal selected from the group consisting of the borides, carbides and nitrides of groups IVA, IVB, VB and VIB of the periodic table produced by filling a mold with powder comprising said refractory hard metal around a negative preform in the shape of a desired cavity within said element.

4. A monolithic cathodic element for a Hall-Heroult aluminum reduction cell, said element having an upper portion having a planar anode-facing surface and a supporting stem having a cross-section smaller in area than said upper surface, said element being approximately mushroom-shaped, said element manufactured by the process of mixing powdered $TiB_2$ having a maximum particle size diameter of $44\mu$ with coal tar pitch having a softening point of 110° C. at a ratio of from 70/30 to 98/2 $TiB_2$/pitch by wt. at about 160° C. until said $TiB_2$ is thoroughly wetted by said pitch, shaping said element in a mold, baking said element on a cycle rising to 700° to 1200° C. over a period of 1 to 10 days in a furnace, removing said element from said furnace and placing said element in an autoclave, impregnating said element under alternate cycles of vacuum and pressure of 1 to $15 \times 10^3$ Pa at 150° to 300° C. with a petroleum-based pitch having a softening point of from 110° to 120° C., baking said element over a 1 to 10 day cycle rising to 700° to 1200°, then further heating said element to 2000° C. to 3000° C., to graphitize the carbon residue of said pitch.

5. The element of claim 4 manufactured by molding a shape around a fugitive insert, forming said element with an inner void space.

6. A monolithic cathodic element for a Hall-Heroult aluminum reduction cell having the approximate configuration of a round toadstool with a substantially horizontal upper round anode-facing surface and a substantially round vertical stem lower support and sole current-carrying means for said anode-facing surface fastened to the floor of said cell, wherein the area of said anode-facing surface is greater than the cross-sectional area of said stem support means, said element comprising a refractory hard metal selected from the group consisting of the borides, carbides and nitrides of metals of groups IVA, IVB, VB and VIB of the periodic table manufactured by the process of pressureless filling a mold with a powder comprising $TiB_2$ having a maximum particle size diameter of 44 microns, placing said mold in a furnace in an argon atmosphere and increasing the temperature to about 2100° C., and cooling to ambient temperature while maintaining said argon atmosphere.

7. A monolithic cathodic element for a Hall-Heroult aluminum reduction cell having the approximate configuration of a round toadstool with a substantially horizontal upper round anode-facing surface and a substantially round vertical stem lower support and sole current-carrying means for said anode-facing surface fastened to the floor of said cell wherein the area of said anode facing surface is greater than the cross-sectional area of said stem support means, said element comprising a mixture of refractory hard metal selected from the group consisting of the borides, carbides and nitrides of metals of groups IVA, IVB, VB and VIB of the periodic table and carbon particles, said element produced by filling a mold with said mixture around a fugitive preform in the shape of a desired cavity within said element.

* * * * *